July 14, 1953   J. H. ANDRESEN, JR   2,645,118
POWER-TIME RECORDER

Filed May 8, 1947   3 Sheets-Sheet 1

INVENTOR.
JOHN H. ANDRESEN Jr.
BY
Myron J. Seibold
ATTORNEY

July 14, 1953  J. H. ANDRESEN, JR  2,645,118
POWER-TIME RECORDER

Filed May 8, 1947  3 Sheets-Sheet 2

INVENTOR.
John H. Andresen jr.

BY
ATTORNEY

July 14, 1953 J. H. ANDRESEN, JR 2,645,118
POWER-TIME RECORDER
Filed May 8, 1947 3 Sheets-Sheet 3

INVENTOR.
JOHN H. ANDRESEN jr.
BY
　　　　Myron J. Seibold
　　　　　　　　ATTORNEY

Patented July 14, 1953

2,645,118

UNITED STATES PATENT OFFICE 2,645,118

POWER-TIME RECORDER

John H. Andresen, Jr., Port Washington, N. Y., assignor, by mesne assignments, to Kollsman Instrument Corporation, Elmhurst, N. Y., a corporation of New York Application May 8, 1947, Serial No. 746,756

1 Claim. (Cl. 73—116)

This invention relates to a power-time recorder for internal combustion engines for totalizing the engine service output in terms of horsepower hours or other power-time units.

The invention is not limited to totalizing the power-time output of aircraft engines since it is clearly adaptable for use in internal combustion engines generally and regardless of their service but supplies a particular need in engines used in aircraft where the present conventional indication of engine wear is secured on a simple time basis. It will be clear that time alone does not indicate engine wear but that this can be supplied only when the time of operation is integrated with the horsepower output of the engine. This integrated value of power and time not only supplies an indication of the usage to which an engine has been subjected to indicate desirability of overhaul, but also provides a more proper basis for rental charges for aircraft use. In the specific embodiment of the invention illustrated in the drawing, this latter function as a taxi meter for aircraft rental has been shown but it will be understood that the invention contemplates an integrating meter with or without a totalizer stamp, which integrating meter indicates the power-time service of an internal combustion engine, aircraft or otherwise.

One object of the invention is the provision of an integrating meter for an internal combustion engine to indicate the power-time service thereof.

Another object of the invention is a power-time recorder for internal combustion engines having means responsive to the manifold pressure of the engine cooperating with means responsive to the speed of the engine to indicate the engine service in horsepower hours or other units of power and time.

A further object of the invention is a power-time recorder in accordance with the preceding object in which the means responsive to manifold pressure is compensated for variations in atmospheric pressure caused by changes in barometric pressure of changes in altitude pressure.

Another object of the invention is a power-time recorder in accordance with the preceding objects having means for directly printing the power-time values registered by the recorder.

Other objects and features of the invention will be readily apparent to those skilled in the art from the specification and appended drawings illustrating certain preferred embodiments in which.

Figure 1:
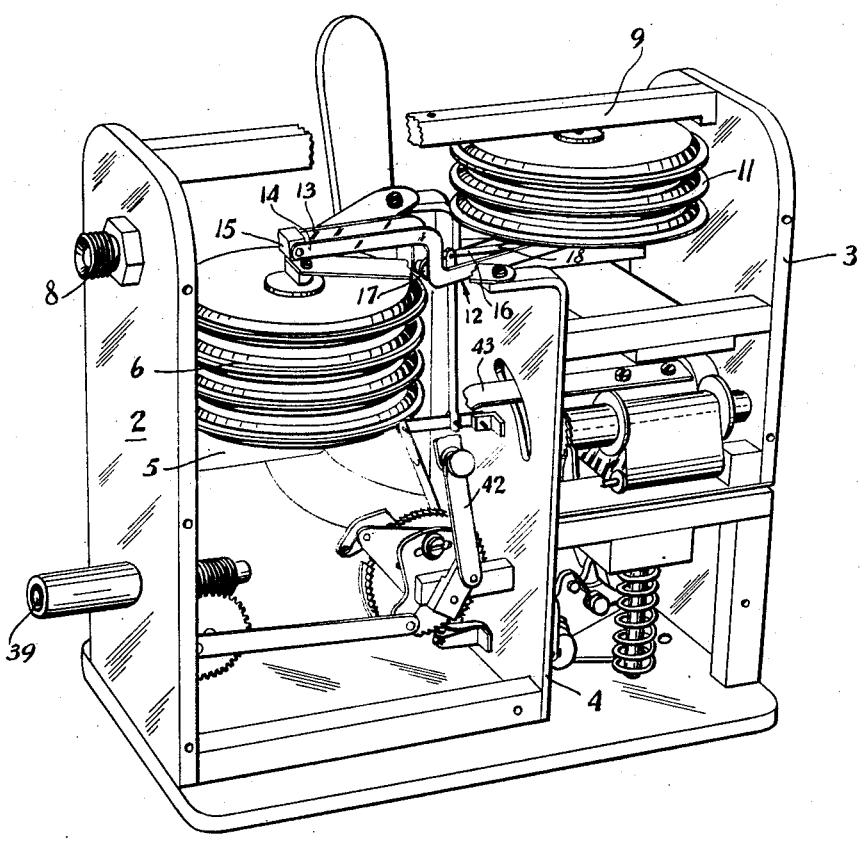
Figure 1 is a perspective view of the power-time recorder according to the present invention.
Figure 2:
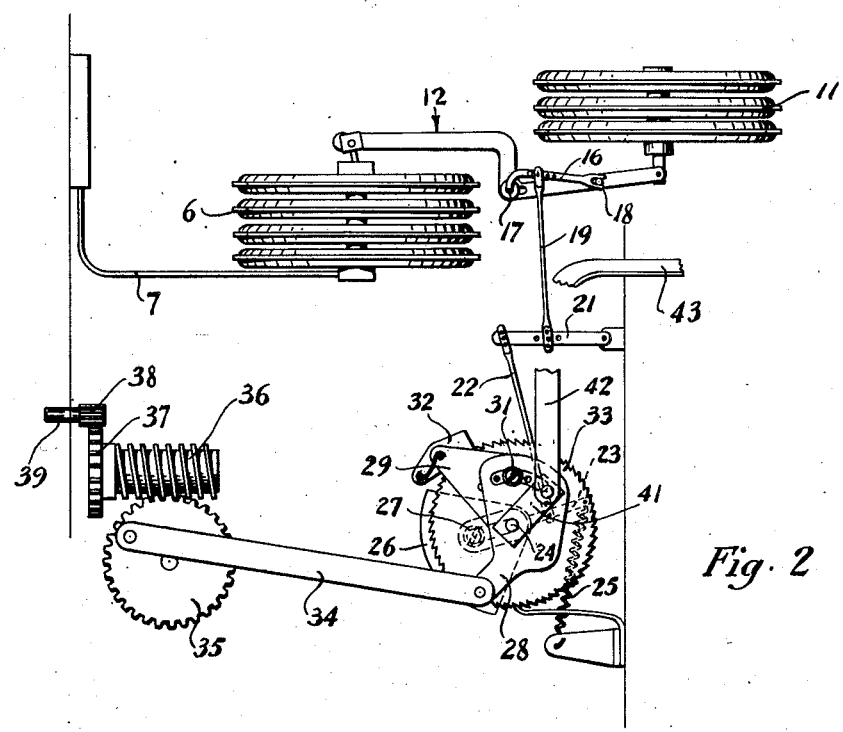
Figure 2 is a schematic representation of the major operating components of the recorder.

The mechanism of the recorder for integrating power and time is more particularly shown in the perspective view of Figure 1 and the schematic representation of Figure 2. There is provided a casing made up of a base 1 and end walls 2 and 3 adapted to be closed by a suitable hood or cover, not shown. Between the walls 2 and 3 is a third vertical supporting wall 4 suitably attached thereto and to the base 1. Upon a support 5 mounted on the end wall 2 is supported a group of diaphragm capsules 6 having their interiors connected through tubing 7 to a connection 8 adapted to be connected to the manifold of an internal combustion engine so that the pressure within the diaphragm capsule 6 is the manifold pressure of the engine.

Upon a support 9 extending between the walls 2 and 3 is mounted a group of aneroid capsules 11 having pivotally mounted on their free end a floating bridge generally indicated at 12 and formed of spaced parallel interconnected arms 13, 14. The free end 15 of the bridge 12 abuts the free end of the diaphragm capsule group 6 so as to be movable thereby but slideable relatively thereto upon relative movement of the capsule groups 6 and 11. Between the arms 13 and 14 is disposed an auxiliary arm 16 which is rigidly connected thereto by means of the pivot at 17 and yoke connection at 18, the arm 16 forming one method of securing an adjustable connection point midway between the arms 13 and 14. To the arm 16 is connected a link 19 which is in turn connected to an intermediate point of a lever 21 having a fixed pivot at one end and carrying at its free end a link 22 which is pivotally connected to an element 23 having a slot receiving a shaft 24, the element 23 being biased in a clockwise direction by means of a tension spring 25. Freely rotatable on the shaft 24 is a sector 26 connected to the element 23 by the adjusting stud 27 so that the element 23 and the sector 26 in their adjusted position rotate together as a unit.

Rotatably mounted on the shaft 24 are a pair of members 28 and 29 adjustably interconnected as a unit by means of the adjusting stud 31, the member 29 carrying a spring biased pawl 32 adapted to engage in one direction of movement with the teeth on the periphery of a ratchet wheel 33 which is rigidly connected to the shaft 24 so as to rotate therewith. A link 34 pivotally interconnects at its opposite ends the member 23 and a pinion 35 driven by a worm gear 36 connected to gear wheel 37 which is in turn driven by a pinion 38 driven by a tachometer shaft 39 adapted to be driven at engine speed.

Figure 4:
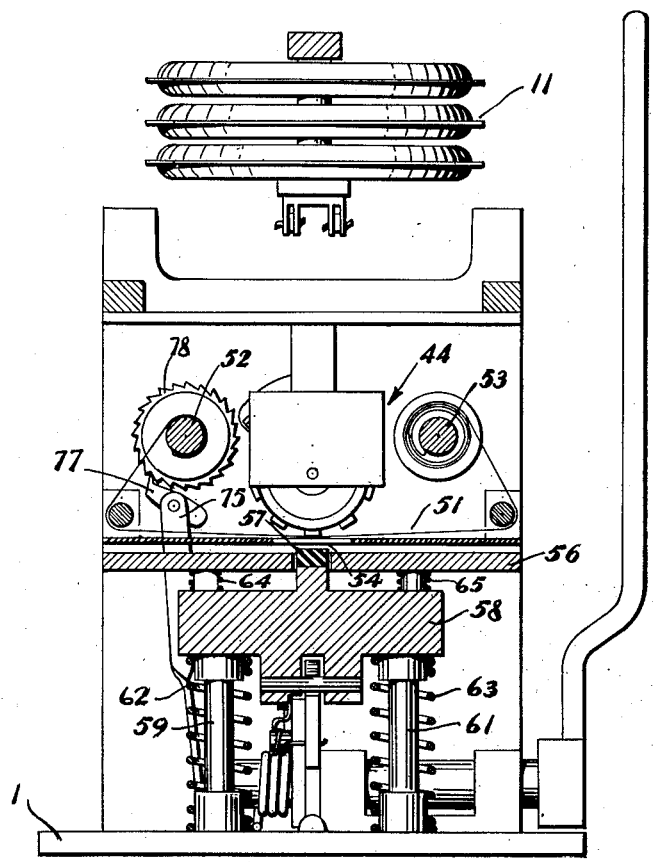
Figure 4 is a vertical sectional view indicating the printing end of the recorder.

Rigidly mounted on shaft 24 so as to be rotatably connected therewith is a crank 41 pivotally connected at its free end to a link 42 whose opposite end is pivotally connected to a yoke 43 connected to operate a conventional counter or register, indicated generally at 44 in Figure 4, which serves to register or totalize the power-time units to which the recorder is calibrated, conventionally, in horsepower hours.

The instrument or meter so far described serves to record or totalize the power-time units of service performed by an internal combustion engine. The mechanism for printing the register information or reading will be described hereinafter after the explanation of the function of the device in integrating manifold pressure and engine speed to indicate the power-time service of the engine.

The position of the free end of the diaphragm capsule group 6 will be determined by the difference between the internal or manifold pressure and the exterior or atmospheric pressure. The position of the free end of the aneroid capsule group 11 will be determined by the exterior atmospheric pressure. The function of the aneroid capsule group 11 is to compensate for the change in the position of the diaphragm capsule group 6 occasioned by change in atmospheric pressure without change in manifold pressure. As the two capsule groups move, there is a point on the floating bridge 12 and arm 16 connected thereto which remains stationary upon change in atmospheric pressure without change in manifold pressure. It is substantially at this point that the link 19 is connected to the arm 16 so that movement of the link 19 is caused substantially by change in manifold pressure only. The word "substantially" is used in the immediate preceding sentence since the link 19 may preferably be connected to the arm 16 at a point slightly removed from that which remains stationary upon change in atmospheric pressure only. This is due to the fact that the power of an internal combustion engine is not the same for a given manifold pressure at varying atmospheric pressures, but also varies to a small degree with change in atmospheric pressure. Hence, it may be desired to connect the link 19 to the arm 16 at a point corresponding to the true relationship between manifold pressure and engine power at an atmospheric pressure corresponding to a probable altitude pressure for engine operation. For example, the point of connection of the lever 19 to the arm 16 might be selected to give a true interpretation of power from manifold pressure at an intermediate value of atmospheric pressure corresponding to 5000 feet altitude. For altitudes different from this, a slight error would be incorporated into the device, but the error over the operating range would be lessened from that which would exist if the lever 19 were connected to the arm 16 at the point which remains stationary on change in atmospheric pressure only. This connection point is a refinement which may or may not be incorporated into the device, as desired.

As the link 19 is moved by change in manifold pressure within the diaphragm capsule group 6, it moves lever 21 and through link 22 moves the sector 26 and the element 23 normally rigid therewith. The sector 26 serves to blanket a portion of the teeth of the ratchet wheel 33 so that they will not be engaged by the pawl 32. Thus, the angular movement of the ratchet wheel 33 occasioned by an oscillation of the pawl 32 is determined by the position of the sector 26 and hence by the manifold pressure of the engine. The pawl 32 is oscillated at a speed determined by the engine speed from tachometer shaft 39. The speed of rotation of the pinion 35 is directly proportional to engine speed and hence the reciprocations of link 34 and oscillations of members 28, 29 and of pawl 32 are proportional to engine speed. Therefore, the ratchet wheel 33 moves in a given period of time through an angular distance determined not only by engine speed (speed of oscillation of pawl 32) but also by the engine manifold pressure (position of sector 26 blanketing teeth on ratchet wheel 33). As the ratchet wheel 33 rotates, it will through crank 41, link 42 and yoke 43 operate the register or recorder 44 so that the register counts the number of revolutions of the ratchet wheel 33. The revolutions of ratchet wheel 33 integrate power and time of engine performance so that the register of the number of revolutions of the ratchet wheel serves to measure the power-time service of the engine.

To facilitate the use of the recorder as a rental meter, there is provided a mechanism for directly imprinting the register reading to indicate the engine service supplied. This mechanism includes a printing tape 51 disposed upon a pair of rolls 52 and 53 and passing between the register numerals and an opening 54 in a plate 55 spaced from a second plate 56 to provide for the insertion of a card or paper upon which the record is to be printed. Beneath the plate 56 and extending through an opening therein in line with the opening 54 is a resilient stamp 57 mounted upon relatively massive member 58 slideably guided upon rods 59 and 61 and biased upwardly by means of relatively heavy springs 62 and 63. Light cushioning springs are provided at 64 and 65. Rigidly mounted in the member 58 is a pin 66 adapted to be engaged by a hook 67 pivotally mounted at 68 upon an arm 69 rigid with a shaft 71 carrying an operating handle 72. The hook 67 is biased into engaged position by a spring 73, and a spring 74 is provided to return the handle 72 to normal position. A link 75 is connected to a crank 76 on the shaft 71 and carries at its upper end a pawl 77 adapted to engage the teeth of a ratchet 78 connected to the roller 52 to effect movement of the ribbon 51 as the printer is used.

Figure 3:
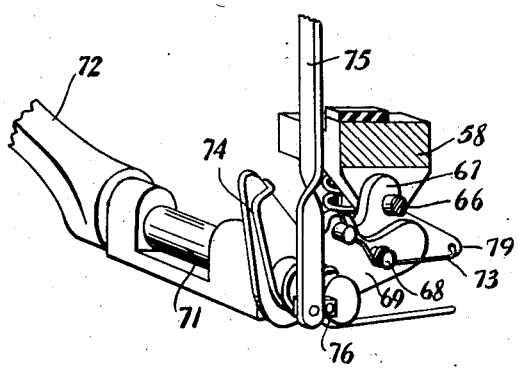
Figure 3 is a detailed perspective view of a portion of the printing mechanism.

To secure a printed record, a card is inserted into the device between the plates 55 and 56 and the handle 72 moved in a clockwise direction as viewed in Figures 1 and 3. This handle rotation effects movement of the member 58 toward the base 1 until the end 79 of hook 67 engages the base 1 and rotates the hook in a counterclockwise direction about its pivot 68 to disengage it from the pin 66. Upon this disengagement the stamp 57 is moved quickly upward under the energy stored in springs 62 and 63 and forces the card against the ribbon 51 and against numerals upon the register 44. This directly prints upon the card the power-time values in the register 44 and provides a convenient permanent record for invoice or file. The handle 72 is returned to its normal position by the spring 74 and the hook 67 moves past the pin 66 into the re-engaged position of Figure 3.

While certain preferred embodiments of the invention have been specifically disclosed, it is understood that the invention is not limited thereto, as many variations will be readily apparent to those skilled in the art and the invention is to be given its broadest possible interpretation within the terms of the following claim.

What is claimed is:

In a power-time recorder for internal combustion engines, a diaphragm capsule adapted to be connected to the engine manifold so that the internal pressure of the capsule corresponds to the engine manifold pressure, the outside of the capsule being acted upon by the pressure of the ambient air, an aneroid capsule responsive to ambient pressure, said aneroid capsule being mounted for expansion in the opposite sense as said diaphragm capsule, a member bridging the free ends of said diaphragm and aneroid capsules, said member being moved in opposite directions substantially normal to the longitudinal axis of said member by said capsules at opposite ends thereof, said member rotating about a point on said longitudinal axis determined by the relative movement of said capsules, said point on said member remaining substantially stationary upon change in ambient pressure without change in manifold pressure, a ratchet wheel, an oscillating pawl engaging said ratchet wheel to effect step by step rotation thereof, means responsive to engine speed for effecting oscillation of said pawl at a frequency proportional to engine speed, a sector adjustable with respect to said pawl for varying the angle within which the pawl engages said ratchet wheel during each oscillation of said pawl, an arm interconnecting said bridging member and said sector to adjust said sector in accordance with variation in manifold pressure and ambient air pressure including means for adjustably connecting said arm with said bridging member at varying distances from said point, and a totalizer registering the revolutions of the ratchet wheel to indicate the power-time service of the engine.

JOHN H. ANDRESEN, Jr.

References Cited in the file of this patent

UNITED STATES PATENTS

| Number | Name | Date |
| --- | --- | --- |
| Re. 15,854 | Marindale | June 3, 1924 |
| 336,336 | Meeze | Feb. 16, 1886 |
| 683,922 | Fortier | Oct. 8, 1901 |
| 991,240 | Purdy | May 2, 1911 |
| 1,621,203 | Houghton | Mar. 15, 1927 |
| 2,070,842 | Reichel et al. | Feb. 16, 1937 |
| 2,159,236 | Uher | May 23, 1939 |
| 2,159,882 | Borden | May 23, 1939 |
| 2,345,281 | Morse | Mar. 28, 1944 |
| 2,392,876 | Potter et al. | Jan. 15, 1946 |